United States Patent [19]

Illy

[11] 4,303,249

[45] Dec. 1, 1981

[54] SEAL FOR A PLATE-SHAPED CLOSURE

[75] Inventor: Alois Illy, Limburgerhof, Fed. Rep. of Germany

[73] Assignee: Klein, Schanzlin & Becker Aktiengesellschaft, Frankenthal, Fed. Rep. of Germany

[21] Appl. No.: 49,975

[22] Filed: Jun. 19, 1979

[30] Foreign Application Priority Data

Jul. 1, 1978 [DE] Fed. Rep. of Germany ....... 2829066

[51] Int. Cl.³ ............................................. F16J 15/32
[52] U.S. Cl. ................................... 277/152; 277/236; 251/173; 251/306
[58] Field of Search ............... 277/152, 153, 208, 236, 277/3, 27; 251/172, 173, 170, 171, 174, 306

[56] References Cited

U.S. PATENT DOCUMENTS

| 2,783,106 | 2/1957 | Barnhart | 277/236 X |
| 3,159,407 | 12/1964 | Strohm | 277/153 X |
| 3,250,541 | 5/1966 | McKinven | 277/152 X |
| 3,834,663 | 9/1974 | Donnelly | 251/173 |

FOREIGN PATENT DOCUMENTS

| 675565 | 12/1963 | Canada | 251/172 |
| 2552524 | 8/1976 | Fed. Rep. of Germany | 277/152 |
| 2648519 | 5/1978 | Fed. Rep. of Germany | 251/306 |
| 463564 | 4/1937 | United Kingdom | 277/DIG. 4 |
| 1010118 | 11/1965 | United Kingdom | 251/173 |
| 499834 | 4/1976 | U.S.S.R. | 277/152 |

*Primary Examiner*—Robert S. Ward, Jr.
*Attorney, Agent, or Firm*—Peter K. Kontler

[57] ABSTRACT

A seal for closing a gap which is present between a tubular housing member and a plate-shaped closing member pivotally mounted within the housing member in the closing position of the closing member includes two resilient sealing lips which, even when unstressed, assume substantially symmetrical curved configurations; when the closing member assumes its closing position, the sealing lips, which have an effective width exceeding that of the gap and which are detachably mounted on the housing member, are stressed and press against the closing member to seal the gap against penetration of media therethrough in either direction. The sealing lips surround the closure in an annular manner and are made of a metallic material.

10 Claims, 1 Drawing Figure

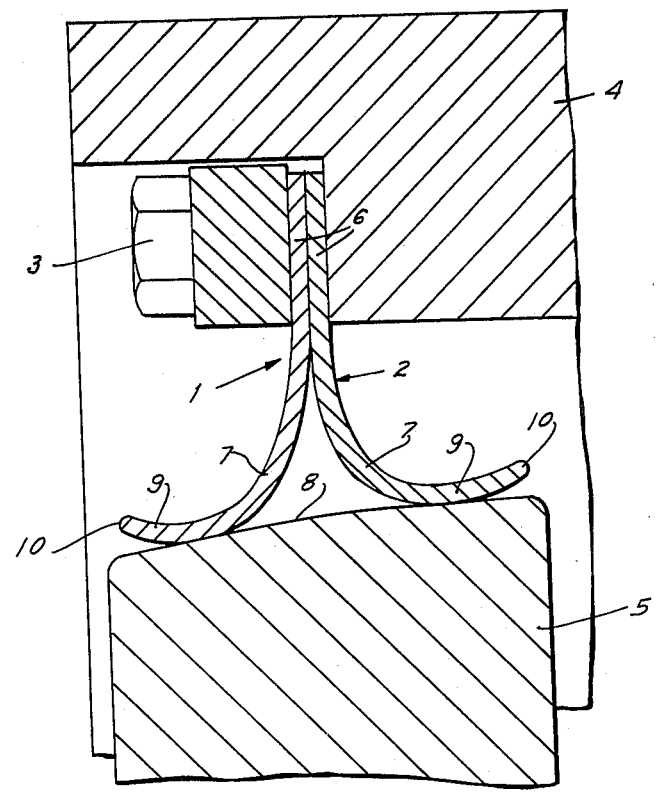

SEAL FOR A PLATE-SHAPED CLOSURE

BACKGROUND OF THE INVENTION

The present invention relates to seals in general, and more particularly to a seal for a plate-shaped closure. Even more particularly, the invention relates to a seal for a plate-shaped closure which is pivotally mounted in a tubular housing.

It is already known, in connection with a plate-shaped closure of the last-mentioned type, to provide an annular, elastic, metallic and lip-shaped sealing element in the housing around the closure, which sealing element then cooperates with a seating surface of the plate-shaped closure, and the arrangement of which renders it possible to achieve a sealing effect in both directions of flow.

Experience has shown that the conventional sealing elements of this type, which, because of the conditions of their use, are required to be made of metallic material, accomplish their sealing function, generally speaking, only in an imperfect manner. In order to obtain a low rate of leakage, the sealing element must be fitted to the circumferential surface of the plate-shaped closure with a high degree of accuracy. It is well known that thin-walled parts of sheet metal can be manufactured with the accuracy required for achieving a low leakage rate only at a high expense. Consequently, high sealing effects can be achieved only with difficulty, if at all, by resorting to the use of such sealing arrangements.

The German published patent application DE-OS No. 25 52 524 discloses a seal which is mounted in a housing and which is supported by pressure in both directions of flow. An important disadvantage of this arrangement is to be seen in the fact that the sealing element must conduct pivotal movements in order to achieve the sealing effect. Now, in order to avoid the pressing-through of this sealing element by the pressure acting thereon, there are provided lateral abutments which limit the extent of pivoting of the sealing element. Once the sealing element abuts the respective abutment, a gap comes into existence between the sealing element and the other abutment. In view of the fact that, for all intents and purposes, the conveyed medium always includes contaminants, there exists the danger that this gap may or will become clogged. When this happens, the reliability of the sealing element can no longer be assured.

OBJECTS AND SUMMARY OF THE INVENTION

Accordingly, it is a general object of the present invention to avoid the disadvantages of the prior art.

More particularly, it is an object of the invention to provide a seal which is not possessed of the disadvantages of the conventional seals of this type.

Still another object of the instant invention is to provide a seal which is pressure-supported in both directions of flow with substantially the same degree of reliability.

A further object of the invention is to so design the seal as to be able to compensate for inaccuracies.

A concomitant object of the invention is to so construct the seal as to be simple to manufacture and mount, inexpensive, and reliable in operation as well.

In pursuance of these objects and others which will become apparent hereafter, one feature of the present invention resides, in a closing arrangement of the type including a housing member bounding an opening and a plate-shaped closing member extending across the opening and defining with the housing member a gap of a predetermined width in a closing position thereof, in a seal for closing the gap which, briefly stated, comprises two resilient sealing lips mounted on one of the members (advantageously on the housing member), extending across the gap, and having an effective width exceeding that of the gap to press against the other of the members (the closing member) in the closing position of the closing member. Advantageously, the sealing lips are discrete elements commonly and detachably mounted on the housing member, and made of a metallic material. It is also preferred for the sealing lips to be annular to circumferentially surround the closing member in the closing position thereof.

In accordance with a currently preferred aspect of the present invention, each of the lips has a non-planar (preferably curved) configuration as considered in the direction of its width even when out of contact with the closing member. It is further advantageous when the sealing lips are curved in opposite directions and when they are substantially symmetrical with respect to a symmetry plate extending therebetween.

As a result of the fact that the width of the sealing lips is greater than that of the corresponding gap, the sealing lips must be slipped under pressure onto the closing member during the assembly. In this manner, there results a calibration of the sealing lips with respect to the circumferential seating surface of the closing member. The result of this calibration is that the sealing lips are fitted, with a high degree of accuracy, to the seating surface of the respective plate-shaped closing member. Irregularities of the seating surface, as well as deformations, manufacturing tolerances and imperfections in curvature of the sealing lips, are thus automatically compensated for during the assembly. As a consequence thereof, the sealing arrangement according to the invention can be produced from drawn parts of sheet metal produced with usual manufacturing tolerances. Thus, the expense for such a seal is maintained at a very low level.

In the conventional sealing arrangements, deformations can occur at the circumference of the plate-shaped closing member as a result of temperature and pressure influences so that the sealing effect of the conventional sealing arrangements can suffer. To this, it is to be added that the circumference of the plate-shaped closing member is bent to different extents under the influence of the pressure of the medium. This bending is relatively low at the mounting locations, and is the highest at the locations which are angularly spaced from the mounting locations by 90 degrees. In view of the fact that the bending loads are different at various portions of the circumference of the plate-shaped closing member, the latter can be deformed to different extents.

The sealing arrangement according to the present invention compensates both for the deformations due to the influence of pressure and temperature and for the deformations of the circumference of the plate-shaped closing member resulting from the different bending thereof. This is due to the fact that, in addition to the premanent deformation, the above-mentioned calibration of the sealing lips causes a stressing of the sealing lips, which assures that the seal will always be in area contact with the seating surface of the closing member and under a certain degree of pre-tension.

Inasmuch as the calibration of the seal is achieved by the same means as those which serve for mounting the seal on the housing, there is obtained the advantage that the calibration takes place also subsequent to the exchange of the seal during the potential maintenance or rebuilding. The mirror-symmetrical arrangement of the sealing lips or elements assures a sealing effect of the same magnitude in both directions of flow. As a result of the use of metallic materials for the sealing lips, the above-enumerated advantages remain intact even at high operating temperatures.

The novel features which are considered as characteristic of the invention are set forth in particular in the appended claims. The invention itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The sole FIGURE of the drawing is a cross-sectional view of a seal according to the invention in its assembled position.

DESCRIPTION OF THE PREFERRED EMBODIMENTS

Referring now to the drawing in detail, it may be seen that the reference numerals 1 and 2 have been used to designate two individual and separate sealing lips. Of course, if so desired, the sealing lips 1 and 2 could be made integral with one another by being folded from a single sealing member. The sealing lips 1 and 2 are commonly mounted, by means of screws 3, in a housing member 4. In the illustrated position, it is assumed that a plate-shaped closing member 5 enters into the sealing lips 1 and 2 from the right, preferably as a result of counterclockwise pivoting of the closing member 5. Each of the sealing lips 1 and 2 has a mounting portion 6, and an arcuate portion 7 which is capable of deformation when subjected to the influence of forces resulting from the introduction of the closing member 5 into the sealing lips 1 and 2. The closing member 5 has a circumferential seating surface 8, and the sealing lips 1 and 2 further have sealing portions 9 which conformingly press against the seating surface 8 upon introduction of the closing member 5 into the space bounded by the sealing lips 1 and 2. Each of the sealing lips 1 and 2 further has an end portion 10 which is bent outwardly in order to assure a faultless introduction of the closing member 5 between the sealing lips 1 and 2. A further function of the end portions 10 is to provide reinforcement in the radial direction so that it is possible to achieve calibration of the sealing portions 9 during the introduction of the closing member 5 into the space bounded by the sealing lips 1 and 2 in such a manner that the neighboring portions of the sealing lips 1 and 2 are not deformed to any impermissible degree.

The sealing lips 1 and 2 are made of a relatively thin-walled drawn sheet material. The inner diameter of the sealing lips 1 and 2 is slightly smaller in the region of the sealing portions 9 than the outer diameter of the plate-shaped adjacent member 5. During the assembly of the arrangement, the sealing lips 1 and 2 are forcibly pressed onto the plate-shaped closure 5 by the tightening of the mounting screws 3. This procedure is repeated on the exchange of the sealing lips 1 and 2. In addition to the exact fitting of the sealing lips 1 and 2 and the sealing portions 9 thereof to the closing member 5 and the seating surface 8, there also occurs an elastic or resilient deformation of the sealing portions 9 of the sealing members or lips 1 and 2. The elastic deformation has the effect that the sealing portions 9 sealingly contact the seating surface 10 of the closing member 5 even under temperature and pressure influences and even when the loading or deformation of the arrangement are non-uniform. Inasmuch as the sealing lips 1 and 2 are arranged in a substantially mirror-symmetrical fashion, there is assured the same sealing effect in both directions of flow.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. In a closing arrangement of the type including a housing member bounding an opening and a plate-shaped closing member extending across the opening and defining with the housing member a gap of a predetermined width in a closing position thereof, a seal for closing the gap, comprising two resilient metallic sealing lips commonly detachably mounted on one of the members in surface contact with one another at the mounting region, extending from said mounting region across the gap, and having an effective width exceeding that of said gap both simultaneously to press against the other of said members in the closing position of the closing member.

2. A seal as defined in claim 1, wherein said one member is the housing member.

3. A seal as defined in claim 1, wherein each of said lips has a non-planar configuration as considered in the direction of its width even when out of contact with said other member.

4. A seal as defined in claim 3, wherein said non-planar configuration is a curved configuration.

5. A seal as defined in claim 4, wherein said sealing lips are curved in opposite directions.

6. A seal as defined in claim 5, wherein said sealing lips are substantially symmetrical with respect to a symmetry plate extending therebetween.

7. A seal as defined in claim 1, wherein said sealing lips are annular to circumferentially surround the closing member in said closing position.

8. A seal as defined in claim 5, wherein said sealing lips are curved away from one another.

9. A seal as defined in claim 1, wherein each of said sealing lips has a substantially flat mounting portion, at said mounting region, and a curved portion extending across said gap, said curved portions of said sealing lips curving away from each other.

10. A seal is defined in claim 9, wherein each of said curved portions merges into a free end portion the spacing of which from said mounting portion is at most equal to said width of said gap even in an unstressed condition of the respective sealing lip to cause said portion to resiliently yield on movement of said closing member toward said closing position and to reinforce said curved portion against excessive yielding.

* * * * *